(12) United States Patent
Wang et al.

(10) Patent No.: US 9,223,775 B2
(45) Date of Patent: Dec. 29, 2015

(54) USER QUESTION PROCESSING METHOD AND SYSTEM

(71) Applicant: TENCENT TECHNOLOGY (SHENZHEN) COMPANY LIMITED, Shenzhen, Guangdong (CN)

(72) Inventors: Liang Wang, Guangdong (CN); Yuekui Yang, Guangdong (CN); Conglei Yao, Guangdong (CN); Chunbo Liu, Guangdong (CN); Feng Jiao, Guangdong (CN); Qi Guo, Guangdong (CN); Ziming Zhuang, Guangdong (CN); Yukun Wang, Guangdong (CN); Jianxun Zhou, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/372,988

(22) PCT Filed: Jan. 16, 2013

(86) PCT No.: PCT/CN2013/070537
§ 371 (c)(1),
(2) Date: Jul. 17, 2014

(87) PCT Pub. No.: WO2013/107345
PCT Pub. Date: Jul. 25, 2013

(65) Prior Publication Data
US 2015/0006156 A1 Jan. 1, 2015

(30) Foreign Application Priority Data
Jan. 18, 2012 (CN) .......................... 2012 1 0015745

(51) Int. Cl.
G06N 5/00 (2006.01)
G06F 17/27 (2006.01)
(Continued)

(52) U.S. Cl.
CPC ........ *G06F 17/2765* (2013.01); *G06F 17/2785* (2013.01); *G06F 17/30616* (2013.01); *G06N 5/02* (2013.01); *G06Q 30/00* (2013.01)

(58) Field of Classification Search
None
See application file for complete search history.

(56) References Cited

U.S. PATENT DOCUMENTS

2003/0074369 A1* 4/2003 Schuetze et al. .......... 707/103 R
2007/0094285 A1* 4/2007 Agichtein et al. ............ 707/101
(Continued)

FOREIGN PATENT DOCUMENTS

CN 101232468 7/2008
CN 102118431 7/2011
(Continued)

OTHER PUBLICATIONS

"Searching semantically similar questions from a large community-based question archive", Mingrong Liu, Yicen Liu, Qing Yang, Natural Language Processing and Knowledge Engineering, 2009. NLP-KE 2009. International Conference on Sep. 24-27, 2009, 8 pages.*
(Continued)

*Primary Examiner* — Kakali Chaki
*Assistant Examiner* — Mai T Tran
(74) *Attorney, Agent, or Firm* — Frommer Lawrence & Haug LLP; William S. Frommer

(57) ABSTRACT

Provided is a user question processing method and system. The method includes: extracting first feature information from a user question; calculating the similarity between the first feature and second feature information of each of at least two websites; posting the question on at least one of the at least two websites according to the similarity. The solution of the embodiment can be applied to a website providing a question and answer service, and the website can post a received user question on another website related to the concerned field of the question, thereby enlarging the scope of the user information exchange.

18 Claims, 5 Drawing Sheets

(51) Int. Cl.
  *G06N 5/02* (2006.01)
  *G06Q 30/00* (2012.01)
  *G06F 17/30* (2006.01)

(56) References Cited

U.S. PATENT DOCUMENTS

2010/0145673 A1* 6/2010 Cancedda .......................... 704/3
2010/0191686 A1* 7/2010 Wang et al. ..................... 706/46
2010/0235343 A1* 9/2010 Cao et al. ...................... 707/710

FOREIGN PATENT DOCUMENTS

| | | | |
|---|---|---|---|
| JP | 2001-188802 | A | 7/2001 |
| JP | 2006-331070 | A | 12/2006 |
| JP | 2012-003589 | A | 1/2012 |

OTHER PUBLICATIONS

International Search Reportissued in corresponding International Application No. PCT/CN2013/070537 mailed Apr. 25, 2013.

Office Action issued in corresponding Japanese Application No. 2014-545090, mailed on May 26, 2015.

* cited by examiner

USER QUESTION PROCESSING METHOD AND SYSTEM

FIELD OF THE TECHNOLOGY

The present disclosure relates to network information processing technology field, and specifically, to a user question processing method and a user question processing system.

BACKGROUND

With development of the computer technology and the Internet technology, the Internet plays an important role in daily life, study, and work of people. Users are used to obtain information and share information through the Internet. For example, many websites provide ask and answer service. In another word, the websites receive questions from the user, display the questions, and receive answers to the question from other users. For example, some websites may specially supply ask and answer service, some websites maybe comprehensive or professional forums, and some websites maybe company websites which the users an exchange using experience of the products of the company.

SUMMARY

The embodiments of present disclosure are illustrated as follows.

A user question processing method, including:

extracting first feature information from a user question;

calculating a similarity between the first feature information and second feature information of each of at least two websites; and posting the question on at least one of the at least two websites according to the similarity.

A user question processing system includes a platform module and an extension module.

The platform module is connected with at least two websites via the extension module; the platform module is configured to extract the first characteristic information from a question of the user, calculate a similarity of the first characteristic information with second characteristic information of each website of at least two websites, select at least one website from the at least two websites according to the similarity, and provide the question to the extension module The extension module is configured to post the question to at least one website.

From the above description, it can be seen that the solution of the embodiments can be applied to a website providing a question and answer service, and the website can post a received user question on another website related to the concern field of the question, thereby enlarging the scope of the user information exchange.

DETAILED DESCRIPTION OF ILLUSTRATED EMBODIMENTS

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments Further description of present disclosure will be illustrated, which combined with embodiments in drawing and detailed embodiments.

Figure 1:
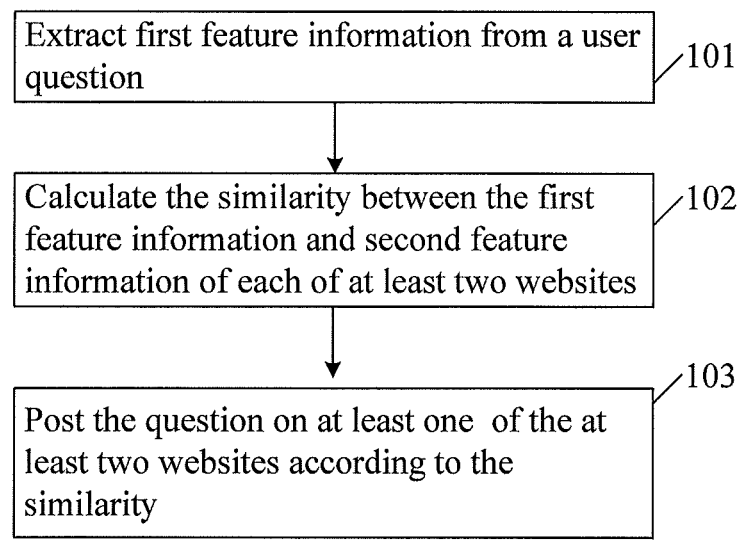
FIG. 1 is a flow chart of a user question processing method according to an embodiment of present disclosure.

Referring to FIG. 1, FIG. 1 is a flow chart of a user question processing method according to an embodiment of present disclosure. The method includes the following steps.

Step 101, extracting first feature information from a user question.

For example, in the step, extracting textual feature information of the user question and other features represent field of the user question, essence content of the user question, etc. The other features may be a keyword.

Step 102, calculating a similarity between the first feature information and second feature information of each of at least two websites.

The step 102 is mainly configured to search other websites relating with the user question.

The second feature information of the website represents feature information, such as, the field of website content. Such as, obtaining content feature information of the website. The content feature information of the website may be a keyword or a classification obtained by obtaining the content posted on the website and processing the content. Or the content feature information of the website can be set up by the website, or can be read by the website which performs the method from a preset location, or can be set up by a manager of the website.

In an embodiment of present disclosure, the step of calculating the similarity between the first feature information with second feature information includes the following steps.

Obtaining a first module of the user question according to the textual feature information. The first module includes a probability of the user question belonging to each classification of at least two content classifications.

Obtaining a second module of the website according the content feature information. The second module includes a probability of the website belonging to each classification of the at least two content classifications.

Calculating the similarity between the first module and the second module, setting the similarity between the first module and the second module as similarity between the first feature information and the second feature information.

The at least two content classifications may be preset classifications or may be obtained from the content of the website. For example, the at least two content classifications may be obtained from the content feature information of the website. The two content classifications may be obtained by multiple ways, such as, obtaining sub-forum structure from the website, obtaining content feature of each sub-forum, and obtaining the content classification of each sub-form. The sub-forum also names section or discussion board.

According to one embodiment of present disclosure, the first module may be obtained by the following way, calculating a first probability of the question of each classification of the at least two content classifications according to the textual feature information, obtaining a first probability vector according to the first probability, and the first probability vector servers as the first module. The second module may be obtained by the following way, calculating a second probability of the website of each classification of the at least two content classifications according to the textual feature information, obtaining a second probability vector according to the second probability, and the second probability vector servers as the second module. It is understood that the way of obtaining the first module and the second module is not limited to the embodiment described above, the first module and the second module may be obtained in other way in other embodiments.

Step 103, posting the question on at least one of the at least two websites according to the similarity.

It can be seen from the above description that the method can be applied to the website which provides ask and answer service. The website can post the question to other website which field is related with the question. Thus, a commutation scope of the user is extended.

Figure 2:
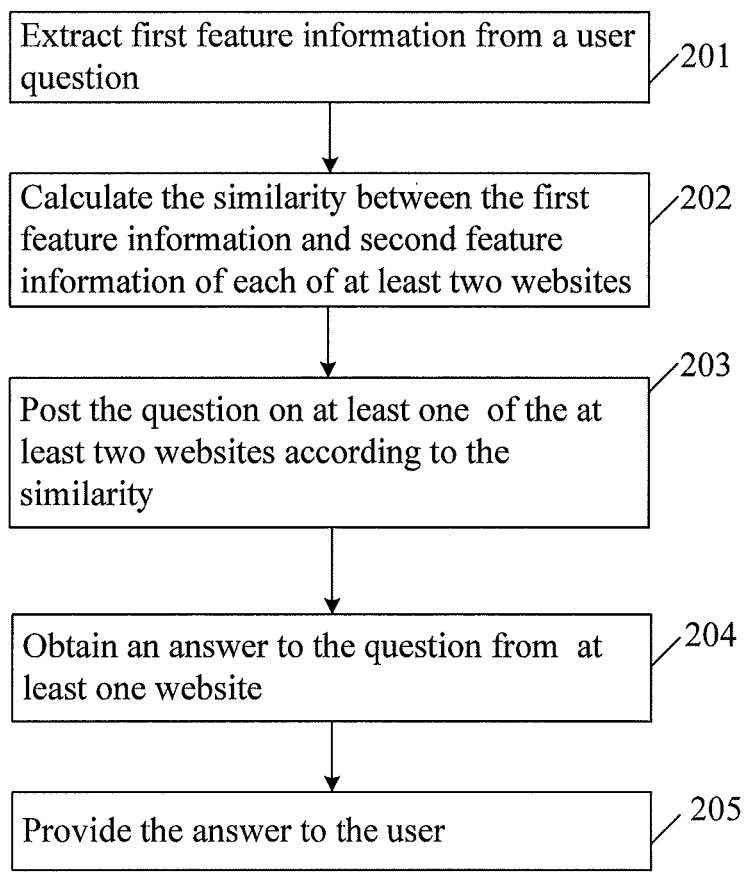
FIG. 2 is a flow chart of a user question processing method according to another embodiment of present disclosure.

Referring to FIG. 2, FIG. 2 is a flow chart of a user question processing method according to another embodiment of present disclosure. The method includes the following steps.

Step 201-Step 203, which are the same with the step 101-Step 103 respectively.

Step 204, obtaining an answer to the question from at least one website.

Step 205, providing the answer to the user.

In the method of the embodiment described above, the website can read the answer to the question from the other website into a local storage, and provide the question to the user. Thus, an efficiency of answering the question is improved.

Some extension may be applied to the above method, for example, the website can periodically read the question and the answer to the question into the local storage from other website. When the website receives a new question of the user, the website firstly searches a similar answer from an ask and answer database of the local storage. Then, the website provides the answer to the user. Or, the website posts the answer to the question to other website of the at least one website, etc.

Considering an activity difference of the website, the method in yet another embodiment of the present disclosure may also include the following steps. For example, the activity may be page views of the website, number of active users of the website.

Obtaining a total number of user behaviors in a time period of each of the at least two websites.

The step of positing the question on at least one of the at least two websites according to the similarity, includes the following steps.

Posting the question on at least one of the at least two websites according to the similarity and the total number of the user behaviors.

The total number of user behaviors in the time period of the website can be the page views of the website in the time period, a total number of questions posted on the website in the time period, and a total number of answers to the questions on the website in the time period, etc.

After obtaining the total number of user behaviors, some procedures to the total number of the user behaviors can be processed for a convenience of calculation. For example, the process may be normalization process.

In an embodiment of present disclosure, the step of posting the question on at least one of the at least two websites according to the similarity and the total number of the user behaviors includes the following steps.

Obtaining an activity factor by processing the total number of the user behaviors of each website.

Setting up the similarity and the activity factor of each website as input parameters of a preset function, and setting up an output value of the preset function as an evaluation value of the website. As to the same activity factor, the greater of the similarity, the greater of the evaluation value. As to the same similarity, the greater of the activity factor, the greater of the evaluation value.

Selecting at least one website of the at least two websites. The evaluation value of the at least one website is greater than the evaluation value of other website of the at least two websites.

The preset function of the method can be set up according to a requirement, for example, the preset function may be a summation function, a product function, and weighted summation function, etc.

Considering of some user questions may not be effective questions or may be junk messages. In an embodiment of present disclosure, before the step of extracting first feature information from a user question, the method further includes extracting third feature information of the question, obtaining a quality parameter of the question according to a preset rule and the second feature information, determining whether the quality parameter is in accordance with a preset conduction. If the quality parameter is in accordance with the preset conduction, the step of extracting first feature information from a user question is implemented; otherwise, end the process of processing the user question.

In an embodiment of present disclosure, the step of posting the question on at least one of the at least two websites includes the following steps. Posting a topic on the discussion board of the least one website. A content of the topic servers as a content of the question.

According to an embodiment of present disclosure, a method of selecting a discussion board for posting the question includes the following steps.

Extracting the textual feature information from the question.

Extracting the content feature information of each discussion board of the website.

Selecting a discussion board according to a matching degree between the textual feature information and the content feature information, and posting the topic on the discussion board.

In another embodiment, the discussion board may be selected according to other rule.

Figure 3:
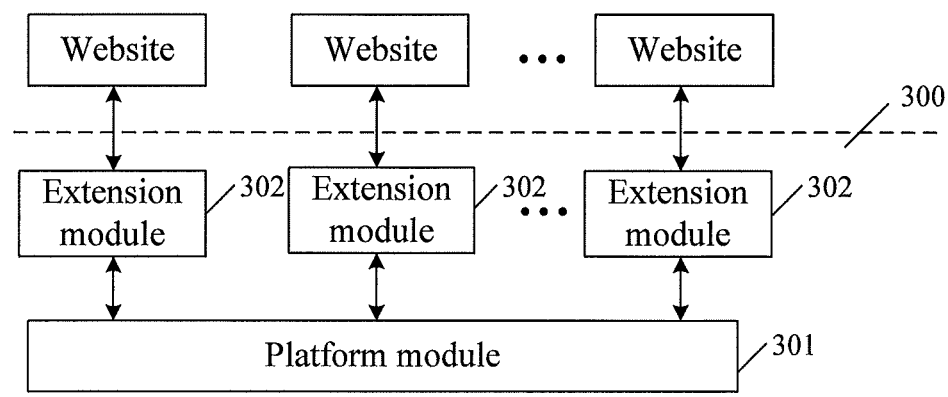
FIG. 3 is a schematic diagram of a user question processing system according to an embodiment of present disclosure.

Referring to FIG. 3, FIG. 3 is a schematic diagram of a user question processing system according to an embodiment of present disclosure. The system 300 mainly includes a platform module 301 and an extension module 302.

The platform module 301 connected with at least two websites via the extension module 302.

The number of the extension module 302 may be one, or more than one. As shown in FIG. 3, the number of the extension module 302 is more than one. In other embodiment the number of the extension 302 can be one.

The platform module 301, the extension module 302, and the website may connect by a communication protocol via a wired or a wireless way, and interchange information.

The platform module 301 is configured to extract the first characteristic information from a question of the user, calculate a similarity of the first characteristic information with second characteristic information of each website of at least two websites, select at least one website from the at least two websites according to the similarity, and provide the question to the extension module 302.

The extension module 302 is configured to post the question to at least one website.

In an embodiment of present disclosure, the platform module 301 includes the following modules.

A question feature extracting module, which is configured to extract textual feature information from the question.

A website feature extracting module, which is configured to extract content feature information from the website via the extension module 302.

A similarity calculating module, which is configured to obtain a first module of the user question according to the textual feature information. The first module includes a probability of the user question belonging to each classification of at least two content classifications. The similarity calculating module is further configured to obtain a second module of the website according the content feature information. The second module includes a probability of the website belonging to each classification of the at least two content classifications. The similarity calculating module is further configured to calculate the similarity between the first module and the second module, setting the similarity between the first module and the second module as similarity between the first feature information and the second feature information.

In an embodiment of present disclosure, the similarity calculating module is further configured to obtain the at least two content classifications from the content feature information extracted by the similarity calculating module, calculate a first probability of the question of each classification of the at least two content classifications according to the textual feature information, obtain a first probability vector according to the first probability, and the first probability vector servers as a first module; and calculate a second probability of the website of each classification of the at least two content classifications according to the textual feature information, obtain a second probability vector according to the second probability, and the second probability vector servers as the a second module.

In an embodiment of present disclosure, the platform may also include a website information obtaining module. The website information obtaining module is configured to obtain a total number of user behaviors in a time period of each of the at least two websites. And the similarity calculating module is further configured to post the question on at least one of the at least two websites according to the similarity and the total number of the user behaviors.

The website information obtaining module may include one or more following modules.

A first obtaining module, which is configured to obtain page views of the website in the time period.

A second obtaining module, which is configured to obtain a total number of questions posted on the website in the time period.

A third obtaining module, which is configured to obtain a total number of answers to the questions on the website in the time period.

In an embodiment of present disclosure, the similarity calculating module is further configured to obtain an activity factor by processing the total number of the user behaviors of each website. The similarity calculating module is further configured to set up the similarity and the activity factor of each website as input parameters of a preset function, and set up an output value of the preset function as an evaluation value of the website. As to the same activity factor, the greater of the similarity, the greater of the evaluation value. As to the same similarity, the greater of the activity factor, the greater of the evaluation value. The similarity calculating module is further configured to select at least one website of the at least two websites. The evaluation value of the at least one website is greater than evaluation value of other website of the at least two websites.

In an embodiment of present disclosure, the platform module further includes a question evaluating module. The question evaluating module is configured to extract third feature information of the question before the step of extracting first feature information from a user question. The question evaluating module is further configured to obtain a quality parameter of the question according to a preset rule and the second feature information. The question evaluating module is further configured to determine whether the quality parameter is in accordance with a preset conduction. If the quality parameter is in accordance with the preset conduction, the question evaluating module provides the question to the question feature extracting module; otherwise, the question evaluating does not provide the question to the question feature extracting module and end the process of processing the question.

The extension module may be an independent device. For example, the extension module may be a device installed in a hardware device of the at least two websites, or a plug-in component installed in the website.

In an embodiment of present disclosure, the extension module is further configured to post a topic on the discussion board of the least one website. A content of the topic servers as a content of the question.

When posting the question, the platform is further configured to extract the textual feature information from the question, extract the content feature information of each discussion board of the website, select a discussion board according to a matching degree between the textual feature information and the content feature information, and post the topic on the discussion board.

In an embodiment of present disclosure, the extension module is further configured to obtain an answer to the question from at least one website and provide the answer to the platform module. The platform module is further configured to provide the answer to the user.

A system is provided in an embodiment of present disclosure. The system provides an open communication interface therefore the system also names an open platform. The system connects with several websites via the extension module. The websites may be websites which provide ask and answer service. Because the websites connected with the system have different features, the system provides a quality evaluating proposal based on the question. The quality evaluating proposal can give score to each question and each website corresponding to different website. The quality is a probability of the question which is answered to on a website.

In another embodiment of present disclosure, a quality evaluating proposal is provided. The quality evaluating proposal may not or less base on a special user feature. For example, the special user feature can be user description, personal information of the user.

Figure 4:
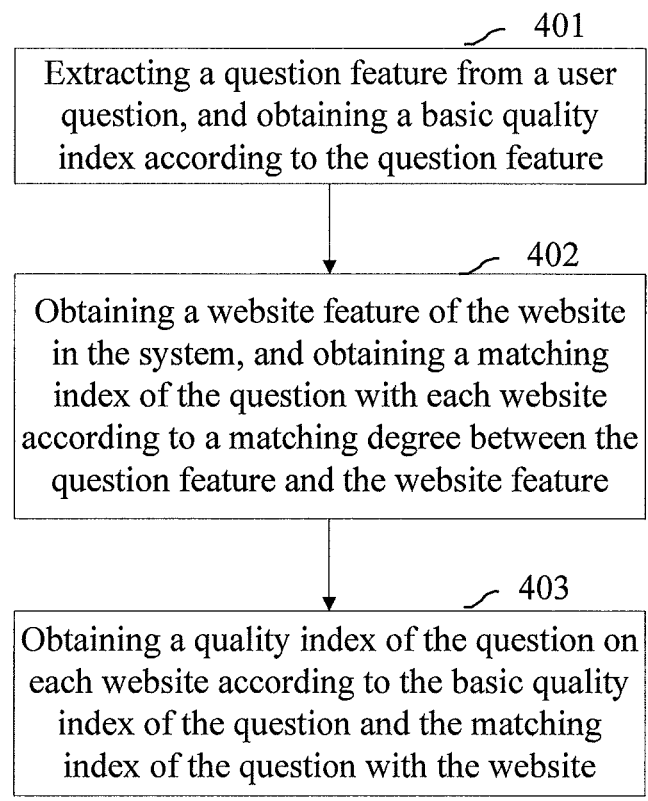
FIG. 4 is a flow chart of a method for determining a quality of question according to an embodiment of present disclosure.

Referring to FIG. 4, FIG. 4 is a flow chart of a method for determining a quality of question according to an embodiment of present disclosure. As shown in the FIG. 4, the method includes the following steps.

Step 401, extracting a question feature from a user question, and obtaining a basic quality index according to the question feature.

The step of obtaining a basic quality index according to the question feature may include the following steps. Collecting corpus which is labeled, establishing a training model by presenting the corpus with feature, and obtaining the basic quality index by applying the question feature to the training model. Hereinto, the feature may refer to a feature value or a feature vector.

Step 402, obtaining a website feature of the website in the system, and obtaining a matching index of the question with each website according to a matching degree between the question feature and the website feature.

In an embodiment according to the present disclosure, obtaining a question model according to the question feature, obtaining a website model according to the website feature, calculating a cosine distance between the question model and the website model, and obtaining the matching index by multiplying the cosine distance and the activity of the website.

Step 403, obtaining a quality index of the question on each website according to the basic quality index of the question and the matching index of the question with the website.

In an embodiment of present disclosure, obtaining the quality index of question on each website by linear weighting the basic quality index of the question and the matching index of the question with the website.

In another embodiment of present disclosure, the method further includes, posting the question to the website which has a highest quality index of the question.

Further description of present disclosure will be illustrated, which combined with embodiments with detailed embodiments.

The probability of the question which is answered to is defined as the quality of the question in an embodiment of present disclosure. Actually, a quality score of the question includes two parts. One part is a basic quality score of the question. In another word, the basic quality score of the question is the basic quality index of the question. The other part is a matching degree score of the question and each website. In another word, the matching degree score of the question and each website is the matching index of the question and each website. The quality score of the question is a linear weighting summation of the basic quality score and the matching degree score. In another word, the linear weighting summation is the quality index of the question.

A measurement of the basic quality score of a question is mainly based on a basic feature of the question, such as clarity. The basic quality score may divide the questions into good classification and a bad classification in a typical automatically classifying method.

An automatically classifying method includes a training process and a forecasting process. The training process includes, collecting amount of labeled corpuses corresponding to a classification system, establishing a model by representing the labeled questions in a feature method, and forming a classifier. The training process includes expressing a new question by feature, inputting the new question to the classifier, and outputting a classification of the new question.

The method of labeling the corpus includes determining whether the question is a high quality question according to a preset rule. The high quality question is a clearly described and sincere tone of question. And the high quality question does not include an inappropriate content. The question is determined to meet all basic conductions and at least one attractive conduction.

The basic conductions may be the following conductions such as not including meaningless content, clearly description, and without typos, etc. The attractive conductions may be requirement explicitly, widely used, and huge number of the similar questions, etc.

The features of a negative example may be, such as, can not form a question, too subjective, too broad, typos, and with a character hard to understand, etc.

A set of features may be designed for describing the question. Because there is only a title of a text, attributions of a text may be used for describing the question. The attributions may be length of a text title, a characteristic whether a word is a hot word, etc. Further description of setting a set of feature will be illustrated, which combined with a table 1.

The table 1 is a characteristic table for basic grading of question.

TABLE 1

| NO. | Feature | Scope |
|---|---|---|
| 1 | length | character length |
| 2 | participle number | number |
| 3 | non-repeat word number | number |
| 4 | question word | include or not |
| 5 | verb number | number |
| 6 | noun number | number |
| 7 | question mark number | number |
| 8 | exclamation mark number | number |
| 9 | meaningless word number | number |
| 10 | non-key word number | number |
| 11 | character number | number |
| 12 | signal word number | number |
| 13 | Martian character number | number |
| 14 | English term number | number |
| 15 | solid word | number |
| 16 | emotion term number | number |
| 17 | negative word | include or not |
| 18 | regional term number | number |
| 19 | name term number | number |
| 20 | emergency degree of the answer | integer |
| 21 | gratitude word number | number |
| 22 | hot word | include or not |
| 23 | new word | include or not |
| 24 | numeral word | include or not |
| 25 | negative word (junk word) | include or not |
| 26 | auxiliary word | include or not |
| 27 | time word (and other time property word) | include or not |

In the typical automatically classifying method, the method includes training the data and generating a model, applying the classifier to other unlabeled questions, and dividing the questions into a good classification and a bad classification.

In an embodiment of present disclosure, the basic quality score of the question may be obtained depended on the classification of the question. For example, if the question is a question of the good classification, the basic quality score of the question is 0.8. Otherwise, the basic quality score of the question is 0.2.

In other words, the basic quality score of the question can be calculated by the following method.

If the question is a question of the bad classification, then, QuestionScore (question)=0.2.

If the question is a question of the good classification, then QuestionScore (question)=0.8.

The method of calculating the basic quality score of the question is described in detail above. The method of calculating the matching degree score of the question and each website is described in detail as the follows. The matching degree score of the question and each website is the matching index of the question and each website.

In detail, a question model and a website model are described in the same model in order to measure a matching degree between the question and the website. In the embodiment of present disclosure, the question model and the website model are established by a classifying method. If a classification number of the models is n, the question model and the website model is a n-dimensional vector, and each element of the n-dimensional vector is the probability of each classification.

The question model is $P(question)=P(x_1, x_2, \ldots, x_n)$. Hereinto, $x_1, x_2, \ldots, x_n$ are the probabilities of the questions belong to the classifications of the website.

The website model is $P(site)=P(y_1, y_2, \ldots, y_n)$. Hereinto, $y_1, y_2, \ldots, y_n$ are the probabilities of the posts of the websites.

A calculating method of the question model is mainly a textual automatically classifying method. For example, a classification probability is obtained by automatically classifying the text by using a simple Bayes theorem or a logic regression.

A calculating method of the website model includes calculating a classification probability vector of each website according to a classification ratio of each question in the website. For example, there are two classifications in a website, and the two classifications are sport classification and digital technology classification. A question number of the sport classification is 20, and a question number of the digital technology classification is 80, then the website model is (probability of sport classification, probability of digital classification)=(0.2, 0.8). The classification of each question can be determined by the textual automatically classifying method.

The method of calculating the matching degree between the question and the website by calculating the similarity of a classification probability model of the question and a classification probability model of the website. Calculating the similarity of the classification probability model of the question and the classification probability model of the website can use a cosine distance similarity method. An expression of the similarity can be illustrated as follows.

$$\text{Similarity}=\text{sim}(P(question),P(site))=\cos<P(question), P(site)>$$

Further description of calculating of the mating degree will be illustrated, which combined with a simply example.

In the example, a website site1 is a forum about computer. There are 100 posts in the forum, 90 posts are about computer products, and the other 10 posts are about games. The website model is illustrated as follows.

$$P(site1)=P(\text{computer products,games})=(90/100,10/100)=(0.9,0.1)$$

If there are three questions and the three questions are question1, question2, and question3.

Question1="Does Lenovo has any good computer products recently?"

Question2="Why the Lenovo Y470N is influent when play the WOW of WARCRAFT?"

Question3="What is the weather like today in Beijing?"

Obtaining the question models of the above three questions by using the textual automatically classifying method.

$$P(question1)=P(\text{computer products,games})=(1,0).$$

$$P(question2)=P(\text{computer products,games})=(0.5,0.5).$$

$$P(question3)=P(\text{computer products,games})=(0,0).$$

Calculating the matching degrees of the three questions and the website by using the cosine distance similarity method.

The matching degree of the question1 and the website site1 is: $\text{sim}(P(question1),P(site1))=\cos<(1,0), (0.9, 0.1)>= [(1*0.9)+(0*0.1)]/[\text{sqrt}(1*1+0*0)*\text{sqrt}(0.9*0.9+0.1*0.1)] =0.9939$. Hereinto, the sqrt means a square-root algorithm.

Using the same method, the matching degree between the question2 and the website site1 is 0.7809, and the matching degree between the question3 and the website site1 is 0.

In the website of large scale, the question number may be hundreds of thousands every day. However, in the website of small scale, the question number may be only dozens every day. Even if the matching degree of one question and one website is high, but the website is a website of small scale, the probability of answering the question may be low.

In another embodiment of present disclosure, an activity index of the website is introduced to determine an activity of the website. The activity index of the website is mainly measured by the number of the questions posted on the website every day. Then the number of the question is processed by the normalization process. Further description is illustrated as the follows.

If the question number of all websites connected with the system every day is M, the question number of one website is N, the activity index of the website is defined as N/M. The activity index of the website is represented by character Livenness.

$$\text{Livenness}=N/M$$

A matching score of the question and the website equals a product of the matching degree and the activity. That is: $\text{SiteSore}(question, site)=\text{Similarity}*\text{Livenness}$ A final score of the question equals the weighted summation of the basic quality score of the question and the matching score of the question and the website. In the embodiment, the final score equals a linear weighted summation of the basic quality score of the question and the matching score of the question and the website.

$$\text{FinalScore}(question,site)=a*\text{QuestionScore}(question)+(1-a)*\text{SiteScore}(question,site)$$

Hereinto, $0<a<1$, and a is a weight which is configured to measure the basic quality score of the question and the matching score of the question and the website. A value of a may be 0.6.

To a question, a table of the quality score of the question in different website is obtained. Then the question is posted to the website which has the highest quality index of the question.

If the question includes more information, such as a description of the question, the information can be used in calculating the basic quality score of the question. Thus, an accuracy of calculating the basic quality score of the question is improved. The classification probability model is used in the above embodiments of present disclosure. But, the invention is not limit to the classification probability model, other models can be used for describing the website in another embodiment of present disclosure. For example, the websites can be divided into more multi-classifications. Or the same description can be used for the questions when calculating the matching degree of the question and the website.

A system for determining the quality of question is provided in an embodiment of present disclosure.

Figure 5:
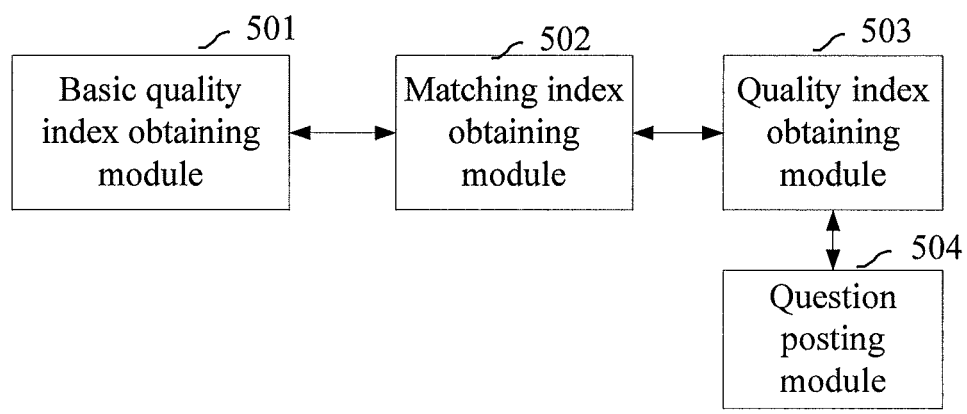
FIG. 5 is a schematic diagram of a system for determining the quality of question according to an embodiment of present disclosure.

Referring to FIG. 5, FIG. 5 is a schematic diagram of a system for determining the quality of question according to an embodiment of present disclosure. The system includes a basic quality index obtaining module 501, a matching index obtaining module 502, and a quality index obtaining module 503.

The basic quality index obtaining module 501 is configured for extracting a question feature from a user question, and obtaining a basic quality index according to the question feature.

The matching index obtaining module 502 is configured for obtaining a website feature of the website in the system, and obtaining a matching index of the question with each website according to a matching degree between the question feature and the website feature.

The quality index obtaining module 503 is configured for obtaining a quality index of the question on each website according to the basic quality index of the question and the matching index of the question with the website.

In another embodiment of present disclosure, the system further includes a question posting module 504. The question posting module 504 is configured for posting the question to the website which has the highest quality index.

In detail, the basic quality index obtaining module 501 is configured for collecting corpus which is labeled, establishing a training model by presenting the corpus with feature, and obtaining the basic quality index by applying the question feature to the training model. The matching index obtaining module 502 is configured for obtaining a question model according to the question feature, obtaining a website model according to the website feature, calculating a cosine distance between the question model and the website model, and obtaining the matching index by multiplying the cosine distance and the activity of the website.

In yet another embodiment of present disclosure, the matching index obtaining module 502 is configured for calculating the question module by using a simple Bayes theorem or a logic regression.

In the embodiments, the question feature is firstly extracted from the question of the user, and the basic quality index according to the question feature is obtained. Secondly, the website feature of the website in the system is obtained, and the matching index between the question with each website according to the matching degree of the question characteristic and the website feature is obtained. Lastly, the quality index of the question on each website according to the basic quality index of the question and the matching index of the question with the website is obtained. Quality score of the question on each website can be given according to different websites, thus the question can be posted to a proper website. An accuracy of determining the quality of the question and the probability of answering the question are improved.

Each module in the above embodiments may be accomplished by using a mechanical method or an electronical method. The module can include a specialized permanent circuit or a logic device to achieve the purpose. The logic device can be a specialized processor, such as a field programmable gate array (FPGA) or an application specific integrated circuit (ASIC). The module can be a programmable logic device (PLD) or circuit temporarily formed by software, such as a general processor. In a mechanical method, the module can be a specialized by a permanent circuit or a circuit temporarily formed by software.

A computer-readable storage medium is provided in the present disclosure. The computer-readable storage medium is configured for storing instructions of implementing the above method. In detail, computer programs are stored in the computer-readable storage medium, and executed by at least one processor of the computer such as a central processing unit (CPU), micro processing unit (MPU).

In this conduction, the programs stored in the computer-readable storage medium can implement part or all of the method described above. Thus, the programs and the computer-readable storage medium server as part of the invention.

The computer-readable storage medium may include software disk, hardware disk, magneto optical disk, compact disc read only memory (CD-ROM), compact disc recordable (CD-R), compact disk rewritable (CD-R), digital video disc read only memory (DVD-ROM), digital video disc random access memory (DVD-RAM), digital video disc-rewritable (DVD-RW), digital video disc+rewritable (DVD+RW). The programs may be downloaded from a server via the commutation network.

A person having an ordinary skill in the art can realize that part or whole of the processes in the methods according to the above embodiments may be implemented by a computer instructing relevant hardware.

Further, the programs read from the computer readable storage medium are written into the storage of an extension plate of the computer. Then part or whole of the processes in the methods according to the above embodiments may be implemented by a central processor unit (CPU) of the extension plate.

The foregoing descriptions are merely exemplary embodiments of the present invention, but not intended to limit the protection scope of the present disclosure. Any variation or replacement made by persons of ordinary skills in the art without departing from the spirit of the present disclosure shall fall within the protection scope of the present disclosure. Therefore, the scope of the present disclosure shall be subject to be appended claims.

What is claimed is:

1. A user question processing method, comprising:
   extracting first feature information from a user question;
   calculating a similarity between the first feature information and second feature information of each of at least two websites; and
   posting the user question on at least one of the at least two websites according to the similarity;
   wherein the step of extracting first feature information from a user question comprises:
      extracting textual feature information of the user question;
   the step of calculating a similarity between the first feature information and second feature information of each of at least two websites comprises:
      obtaining content feature information of the website;
      obtaining a first module of the user question according to the textual feature information; the first module comprises a probability of the user question belonging to each classification of at least two content classifications;
      obtaining a second module of the website according to the content feature information; the second module comprises a probability of the website belonging to each classification of the at least two content classifications;
      calculating the similarity between the first module and the second module, setting the similarity between the first module and the second module as a similarity between the first feature information and the second feature information.

2. The method according to claim 1, wherein the step of obtaining a first module of the user question according to the textual feature information, and the step of obtaining a second module of the website according the content feature information comprise:

obtaining the at least two content classifications from the content feature information;

calculating a first probability of the question of each classification of the at least two content classifications according to the textual feature information, obtaining a first probability vector according to the first probability, and the first probability vector serving as the first module; and calculating a second probability of the website of each classification of the at least two content classifications according to the textual feature information, obtaining a second probability vector according to the second probability, and the second probability vector serving as the second module.

3. The method according to claim 1, further comprising:
obtaining a total number of user behaviors in a time period of each of the at least two websites;
the step of posting the question on at least one of the at least two websites according to the similarity comprising:
posting the question on at least one of the at least two websites according to the similarity and the total number of the user behaviors.

4. The method according to claim 3, wherein the step of obtaining a total number of user behaviors in a time period of each of the at least two websites comprises at least one of the following steps:
obtaining page views of the website in the time period;
obtaining a total number of questions posted on the website in the time period;
obtaining a total number of answers to the questions on the website in the time period.

5. The method according to claim 3, wherein the step of posting the question on at least one of the at least two websites according to the similarity and the total number of the user behaviors comprises:
obtaining an activity factor by processing the total number of the user behaviors of each website;
setting up the similarity and the activity factor of each website as input parameters of a preset function, and setting up an output value of the preset function as an evaluation value of the website; as to the same activity factor, the greater of the similarity, the greater of the evaluation value; as to the same similarity, the greater of the activity factor, the greater of the evaluation value; and
selecting at least one website of the at least two websites; the evaluation value of the at least one website is greater than the evaluation value of other website of the at least two websites.

6. The method according to claim 1, further comprising:
before the step of extracting first feature information from a user question, extracting third feature information of the question;
obtaining a quality parameter of the question according to a preset rule and the second feature information;
determining whether the quality parameter is in accordance with a preset conduction; when the quality parameter is in accordance with the preset conduction, the step of extracting first feature information from a user question is implemented; otherwise, end the process of processing the user question.

7. The method according to claim 1, wherein the step of posting the question on at least one of the at least two websites according to the similarity comprises:
posting a topic on the discussion board of the least one website; a content of the topic is a content of the question.

8. The method according to claim 7, wherein the step of posting a topic on the discussion board of the least one website comprises:
extracting the textual feature information from the question;
extracting the content feature information of each discussion board of the website; and
selecting a discussion board according to a matching degree between the textual feature information and the content feature information, and posting the topic on the discussion board.

9. The method according to claim 1, further comprising:
obtaining an answer to the question from at least one website; and
providing the answer to the user.

10. A user question processing system, comprising a platform module and an extension module;
the platform module connecting with at least two websites via the extension module; the platform module being configured to extract the first characteristic information from a question of the user, calculate a similarity of the first characteristic information with second characteristic information of each website of at least two websites, select at least one website from the at least two websites according to the similarity, and provide the question to the extension module;
the extension module being configured to post the question to at least one website;
wherein the platform module comprises:
a question feature extracting module, which is configured to extract textual feature information from the question;
a website feature extracting module, which is configured to extract content feature information from the website via the extension module; and
a similarity calculating module, which is configured to obtain a first module of the user question according to the textual feature information; the first module comprises a probability of the user question belonging to each classification of at least two content classifications; the similarity calculating module is further configured to obtain a second module of the website according the content feature information; the second module includes a probability of the website belonging to each classification of the at least two content classifications; the similarity calculating module is further configured to calculate the similarity between the first module and the second module, setting the similarity between the first module and the second module as similarity between the first feature information and the second feature information.

11. The system according to claim 10, wherein the similarity calculating module is further configured to obtain the at least two content classifications from the content feature information extracted by the similarity calculating module, calculate a first probability of the question of each classification of the at least two content classifications according to the textual feature information, obtain a first probability vector according to the first probability, and the first probability vector serving as the first module; calculate a second probability of the website of each classification of the at least two content classifications according to the textual feature information, obtain a second probability vector according to the second probability, and the second probability vector serving as the second module.

12. The system according to claim 10, wherein the platform module is further configured to obtain a total number of user behaviors in a time period of each of the at least two websites;

positing the question on at least one of the at least two websites according to the similarity, comprises:
posting the question on at least one of the at least two websites according to the similarity and the total number of the user behaviors.

13. The system according to claim 12, wherein the platform module comprises one module of:
a first obtaining module, which is configured to obtain page views of the website in the time period;
a second obtaining module, which is configured to obtain a total number of questions posted on the website in the time period;
a third obtaining module, which is configured to obtain a total number of answers to the questions on the website in the time period.

14. The system according to claim 12, wherein the platform module is further configured to
obtain an activity factor by processing the total number of the user behaviors of each website;
set up the similarity and the activity factor of each website as input parameters of a preset function, and set up an output value of the preset function as an evaluation value of the website; as to the same activity factor, the greater of the similarity, the greater of the evaluation value; as to the same similarity, the greater of the activity factor, the greater of the evaluation value;
select at least one website of the at least two websites; the evaluation value of the at least one website is greater than evaluation value of other website of the at least two websites.

15. The system according to claim 10, wherein the platform is further configured to
extract third feature information of the question before the step of extracting first feature information from a user question;
obtain a quality parameter of the question according to a preset rule and the second feature information; and
determine whether the quality parameter is in accordance with a preset conduction; when the quality parameter is in accordance with the preset conduction, the question evaluating module provides the question to the question feature extracting module; otherwise, the question evaluating does not provide the question to the question feature extracting module and end the process of processing the question.

16. The system according to claim 10, wherein the extension module is further configured to post a topic on the discussion board of the least one website; a content of the topic is a content of the question.

17. The system according to claim 10, wherein the platform module is further configured to
extract the textual feature information from the question;
extract the content feature information of each discussion board of the website;
select a discussion board according to a matching degree between the textual feature information and the content feature information; and
post the topic on the discussion board.

18. The system according to claim 10, wherein the extension module is further configured to obtain an answer to the question from at least one website and provide the answer to the platform module; and
the platform module is further configured to provide the answer to the user.

* * * * *

UNITED STATES PATENT AND TRADEMARK OFFICE
CERTIFICATE OF CORRECTION

PATENT NO. : 9,223,775 B2
APPLICATION NO. : 14/372988
DATED : December 29, 2015
INVENTOR(S) : Liang Wang et al.

It is certified that error appears in the above-identified patent and that said Letters Patent is hereby corrected as shown below:

In the Claims

In claim 2, column 12, line 66, after the word "according", please add the word --to--.

Signed and Sealed this
Twelfth Day of July, 2016

Michelle K. Lee
*Director of the United States Patent and Trademark Office*